(12) United States Patent
Yokota et al.

(10) Patent No.: US 9,249,267 B2
(45) Date of Patent: Feb. 2, 2016

(54) RESIN-ADDITIVE MASTERBATCH

(75) Inventors: Akiko Yokota, Saitama (JP); Takahiro Horikoshi, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 273 days.

(21) Appl. No.: 13/699,223

(22) PCT Filed: May 20, 2011

(86) PCT No.: PCT/JP2011/061620
§ 371 (c)(1),
(2), (4) Date: Nov. 20, 2012

(87) PCT Pub. No.: WO2011/148868
PCT Pub. Date: Dec. 1, 2011

(65) Prior Publication Data
US 2013/0065994 A1    Mar. 14, 2013

(30) Foreign Application Priority Data
May 26, 2010 (JP) ................................. 2010-120578

(51) Int. Cl.
C08J 3/22 (2006.01)
C08K 5/098 (2006.01)
C08K 5/1575 (2006.01)
C08K 5/527 (2006.01)

(52) U.S. Cl.
CPC .............. *C08J 3/226* (2013.01); *C08J 2323/00* (2013.01); *C08J 2367/00* (2013.01); *C08J 2377/00* (2013.01); *C08J 2381/04* (2013.01); *C08K 5/098* (2013.01); *C08K 5/1575* (2013.01); *C08K 5/527* (2013.01)

(58) Field of Classification Search
CPC .. C08K 3/0025; C08K 3/0033; C08K 3/0041; C08L 23/025
USPC ........................... 524/99, 450, 606
See application file for complete search history.

(56) References Cited

U.S. PATENT DOCUMENTS

| | | | |
|---|---|---|---|
| 5,814,697 A | 9/1998 | Akao et al. | |
| 5,837,759 A | 11/1998 | Trauth et al. | |
| 8,173,735 B2 * | 5/2012 | Saitou et al. | 524/450 |

| | | | |
|---|---|---|---|
| 2010/0093899 A1 | 4/2010 | Saitou et al. | |
| 2010/0204374 A1 | 8/2010 | Tanji et al. | |
| 2011/0105657 A1 | 5/2011 | Tanji et al. | |

FOREIGN PATENT DOCUMENTS

| | | |
|---|---|---|
| CN | 1916074 A | 2/2007 |
| JP | 8-53549 A | 2/1996 |
| JP | 9-52956 A | 2/1997 |
| JP | 9-87290 A | 3/1997 |
| JP | 10-512320 A | 11/1998 |
| JP | 2000-80172 A | 3/2000 |
| JP | 2001-310948 A | 11/2001 |
| JP | 2008-189822 A | 8/2008 |
| JP | 2009-62417 A | 3/2009 |
| WO | WO 2009/139350 A1 | 11/2009 |

OTHER PUBLICATIONS

Machine Translation of JP 2001-310948 (2001).*
Machine Translation of JP 08-053549 (1996).*
International Search Report, dated Jun. 21, 2011, issued in PCT/JP2011/061620.
Chinese Office Action and Search Report, dated Jul. 19, 2013, for Chinese Application No. 201180026025.3, including partial English translation.
Extended European Search Report, dated Apr. 9, 2015, for European Application No. 11786567.5.

* cited by examiner

*Primary Examiner* — Hannah Pak
(74) *Attorney, Agent, or Firm* — Birch, Stewart, Kolasch & Birch, LLP

(57) ABSTRACT

Disclosed is a resin additive masterbatch which not only is capable of containing a resin additive having a low melting point at a high concentration, but also can be continuously produced without strand breakage and has an improved surface tackiness. The resin additive masterbatch contains, with respect to 100 parts by mass of (A) a crystalline resin, 100 to 900 parts by mass of (B) a resin additive, 0.1 to 10 parts by mass of (C) a metal salt of an organic acid other than fatty acid and 0.1 to 10 parts by mass of (D) a gelling agent, the resin additive masterbatch being characterized in that the above-described (B) resin additive retains a liquid state when melted with heating to 250° C. and then cooled to 80° C. and kept for 30 minutes.

10 Claims, No Drawings

RESIN-ADDITIVE MASTERBATCH

TECHNICAL FIELD

The present invention relates to a resin additive masterbatch. More particularly, the present invention relates to a resin additive masterbatch comprising a low-melting resin additive at a high concentration in which the productivity and the surface tackiness are improved.

BACKGROUND ART

Resin additives such as phenolic antioxidants, UV absorbers and hindered amine compounds are known to suppress degradation of organic materials such as synthetic resins by light or heat.

As the compounds used as such resin additives, those compounds which generally have a high melting point and are not likely to plasticize a resin or vaporize from a resin, such as tetrakis(3-(3,5-di-tert-butyl-4-hydroxyphenyl)propionyloxymethyl)methane and tris(2,4-di-tert-butylphenyl)phosphite, are preferred. However, when such a compound is made to have an excessively high molecular weight, the additive cannot move within the resin, so that the stabilizing effect thereof tends to be decreased.

Meanwhile, low-melting compounds such as stearyl(3,5-di-tert-butyl-4-hydroxyphenyl)propionate and bis(2,2,6,6-tetramethylpiperidyl)sebacate have a relatively low molecular weight and have excellent initial stabilizing effect; however, since they easily vaporize from a resin, their long-term stabilizing effect is poor. Furthermore, since, for example, these low-melting compounds are liquid, viscous or powdery and form large aggregates due to caking during storage, the ease of handling is poor and, therefore, they are required to be masterbatched in order to improve the ease of handling.

However, when used in a crystalline resin, those compounds usually used as a resin additive have a low compatibility with the resin and, in the preparation of a masterbatch containing such a compound at a high concentration, there is a problem that the additive compound exudes to the surface of the masterbatch pellet to cause caking of the pellet. Therefore, such an additive compound can be blended in an amount of only 50 parts by mass or so with respect to 100 parts by mass of a crystalline resin, so that the merits of making the additive compound into a masterbatch are small.

Particularly, although hindered amine compounds obtained by a reaction between a piperidinol and a fatty acid exhibit excellent antiweatherability-imparting effect, they are likely to assume a liquid form at a low molecular weight and, in cases where they are made into a masterbatch in order to improve the ease of handling, since the additive exudes to the surface of the masterbatched resin composition and shows adhesiveness, it is required that the masterbatch have a low concentration. Furthermore, in cases where the concentration of such hindered amine compound is high, there is also a problem that the strand strength during masterbatch production becomes low, so that a masterbatch cannot be stably and continuously produced.

As a method of improving the ease of handling and the like of an additive, there have been proposed, for example, a method in which the tackiness is suppressed by masterbatching an additive compound with an oil-absorbing polymer (Patent Document 1), a method in which strand breakage is inhibited by making an additive compound into a masterbatch having a core layer and a sheath layer (Patent Document 2), a method in which the tackiness is suppressed and strand breakage is inhibited by masterbatching an additive compound with an organic acid metal salt (Patent Document 3), a method in which an additive compound is made into a microcapsule (Patent Document 4) and a method in which the powder characteristics are improved by promoting crystallization of a low-melting flame retardant (Patent Document 5). All of these are techniques that improve the ease of handling of a liquid low-melting additive.

RELATED ART DOCUMENTS

Patent Documents

Patent Document 1: Japanese Unexamined Patent Application Publication No. 119-52956 (Claims)
Patent Document 2: Japanese Unexamined Patent Application Publication No. 2000-80172 (Claims)
Patent Document 3: Japanese Unexamined Patent Application Publication No. 2008-189822 (Claims)
Patent Document 4: Japanese Unexamined Patent Application Publication (Translation of PCT Application) No. H10-512320 (Claims)
Patent Document 5: Japanese Unexamined Patent Application Publication No. H9-87290 (Claims)

SUMMARY OF THE INVENTION

Problems to be Solved by the Invention

However, as described in the above, it is difficult to prepare a masterbatch product having a high concentration and the use of an oil-absorbing polymer as disclosed in Patent Document 1 causes the oil-absorbing polymer to remain in the resulting resin composition. In addition, microencapsulation is costly and, although promotion of crystallization improves the ease of handling as compared to a case where an amorphous composition is used, such a method cannot be applied to liquid products. Moreover, in cases where the crystal product has a low melting point, the caking-preventing effect is small. Therefore, in the conventional methods, the effect of improving the ease of handling is limited.

Accordingly, an object of the present invention is to provide a resin additive masterbatch which not only solves the above-described problems without causing other problems as in the case of conventional ones and is capable of containing a resin additive having a low melting point (not higher than 80° C.) at a high concentration, but also can be continuously produced without strand breakage and has an improved surface tackiness.

Means for Solving the Problems

In view of the above-described current circumstances, the present inventors intensively studied to discover that the above-described problems can be solved by adding a specific metal salt compound and gelling agent in prescribed amounts to an additive masterbatch prepared by blending a resin additive to a crystalline resin, which resin additive retains a liquid state when melted with heating to 250° C. and then cooled to 80° C. and kept for 30 minutes, thereby completing the present invention.

That is, the resin additive masterbatch according to the present invention is a resin additive masterbatch which comprises, with respect to 100 parts by mass of (A) a crystalline resin, 100 to 900 parts by mass of (B) a resin additive, 0.1 to 10 parts by mass of (C) a metal salt of an organic acid other than fatty acid and 0.1 to 10 parts by mass of (D) a gelling agent, the (B) resin additive retaining a liquid state when melted with heating to 250° C. and then cooled to 80° C. and kept for 30 minutes.

In the resin additive masterbatch according to the present invention, it is preferred that the above-described (C) metal salt of an organic acid other than fatty acid be at least one of an aromatic phosphate represented by the following Formula (1), an aromatic carboxylate represented by the following Formula (2) and an alicyclic carboxylate represented by the following Formula (3) or (4):

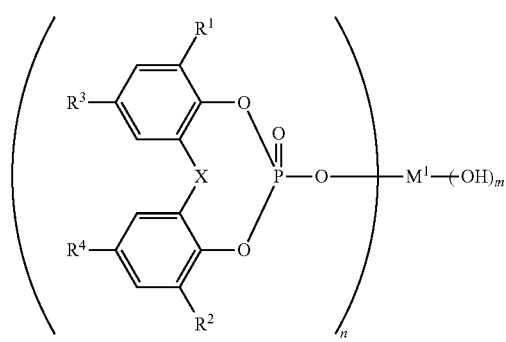

(wherein, $M^1$ represents an alkali metal, an alkaline earth metal or aluminum; n represents 1 when $M^1$ is an alkali metal, 1 or 2 when $M^1$ is an alkaline earth metal, or 1, 2 or 3 when $M^1$ is aluminum; m represents 0 when n has the same valence as $M^1$, 1 when n has a valence one smaller than that of $M^1$, or 2 when n has a valence two smaller than that of $M^1$; $R^1$ to $R^4$ each independently represent a hydrogen atom or a $C_1$ to $C_8$ alkyl group; and X represents a direct bond or a $C_1$ to $C_4$ alkanediyl group)

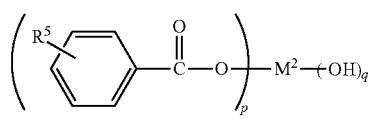

(wherein, $M^2$ represents an alkali metal, an alkaline earth metal or aluminum; p represents 1 when $M^2$ is an alkali metal, 1 or 2 when $M^2$ is an alkaline earth metal, or 1, 2 or 3 when $M^2$ is aluminum; q represents 0 when p has the same valence as $M^2$, 1 when p has a valence one smaller than that of $M^2$, or 2 when p has a valence two smaller than that of $M^2$; and $R^5$ represents a hydrogen atom or a $C_1$ to $C_8$ alkyl group)

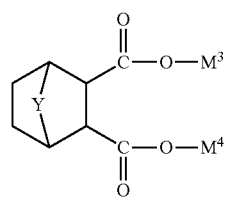

(wherein, Y represents methylene or ethylene; and $M^3$ and $M^4$ each represent an alkali metal)

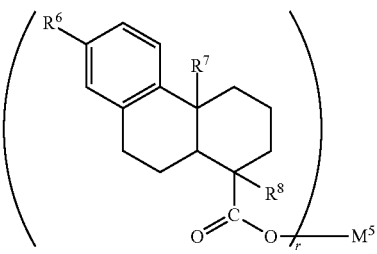

(wherein, $R^6$ to $R^8$ each represent a hydrogen atom or a $C_1$ to $C_8$ alkyl group; $M^5$ represents an alkali metal or an alkaline earth metal; and r represents 1 or 2).

Further, in the resin additive masterbatch according to the present invention, it is preferred that the above-described (D) gelling agent be a dibenzylidene sorbitol compound represented by the following Formula (5):

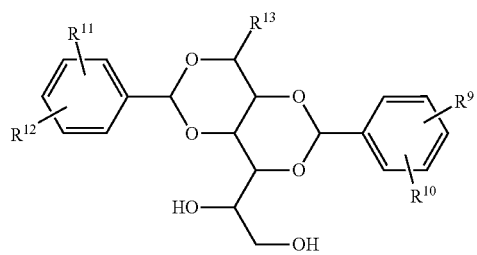

(wherein, $R^9$ to $R^{13}$ each independently represent a hydrogen atom, a halogen atom or a $C_1$ to $C_4$ alkyl group).

Further, in the resin additive masterbatch according to the present invention, it is preferred that the above-described (D) gelling agent be a 12-hydroxystearic acid-based compound selected from the group consisting of 12-hydroxystearic acid, alkali metal salts and alkaline earth metal salts of 12-hydroxystearic acid and 12-hydroxystearic acid amide compounds.

Further, in the resin additive masterbatch according to the present invention, a polyolefin resin may be suitably used as the above-described (A) crystalline resin.

Further, in the resin additive masterbatch according to the present invention, it is preferred that the above-described (B) resin additive be any one of a phenolic antioxidant, a phosphorus-based antioxidant, a sulfur-based antioxidant, a UV absorber and a hindered amine compound, or a mixture thereof.

Further, in the resin additive masterbatch according to the present invention, it is preferred that the above-described (B) resin additive comprise not less than 10% by mass of a hindered amine compound represented by the following Formula (6):

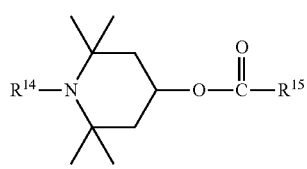

(wherein, $R^{14}$ represents a hydrogen atom, a $C_1$ to $C_4$ alkyl group, alkyl group substituted with a hydroxy group, alkoxy group, alkoxy group substituted with a hydroxy group, alkanoyl group, alkanoyloxy group, a benzoyl group or a benzoyloxy group; and $R^{15}$ represents a $C_5$ to $C_{21}$ alkyl group).

Further, in the resin additive masterbatch according to the present invention, it is preferred that the above-described (B) resin additive comprise not less than 10% by mass of a benzoate compound represented by the following Formula (7):

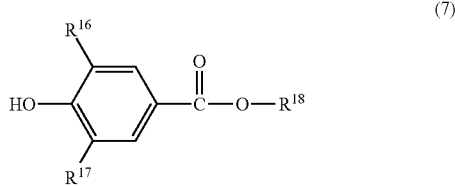

(7)

(wherein, $R^{16}$ and $R^{17}$ each represent a $C_1$ to $C_8$ alkyl group; and $R^{18}$ represents a $C_1$ to $C_{30}$ alkyl group).

Further, it is preferred that the resin additive masterbatch according to the present invention comprise (E) an agent for lowering the melting point of the above-described gelling agent in an amount of 1 to 30 parts by mass with respect to 100 parts by mass of the (D) gelling agent.

The method of producing a resin additive masterbatch according to the present invention is a method of producing a resin additive masterbatch comprising 100 to 900 parts by mass of (B) a resin additive with respect to 100 parts by mass of (A) a crystalline resin, which resin additive retains a liquid state when melted with heating to 250° C. and then cooled to 80° C. and kept for 30 minutes, the method being characterized by blending 0.1 to 10 parts by mass of (C) a metal salt of an organic acid other than fatty acid and 0.1 to 10 parts by mass of (D) a gelling agent to 100 parts by mass of the above-described (A) crystalline resin.

Effects of the Invention

By the present invention, a resin additive masterbatch which not only is capable of containing a resin additive having a low melting point (not higher than 80° C.) at a high concentration, but also can be continuously produced without strand breakage and has an improved surface tackiness, can be provided.

MODE FOR CARRYING OUT THE INVENTION

Preferred modes of the present invention will now be described in detail.

The resin additive masterbatch according to the present invention is a resin additive masterbatch which comprises, with respect to 100 parts by mass of (A) a crystalline resin, 100 to 900 parts by mass of (B) a resin additive, 0.1 to 10 parts by mass of (C) a metal salt of an organic acid other than fatty acid and 0.1 to 10 parts by mass of (D) a gelling agent, and is characterized in that the (B) resin additive retains a liquid state when melted with heating to 250° C. and then cooled to 80° C. and kept for 30 minutes.

Examples of the (A) crystalline resin according to the present invention include polyolefin-based resins including α-olefin polymers (e.g. low-density polyethylene, linear low-density polyethylene, high-density polyethylene, isotactic polypropylene, syndiotactic polypropylene, hemi-isotactic polypropylene, cycloolefin polymer, stereoblock polypropylene, polybutene-1, poly-3-methyl-1-butene, poly-3-methyl-1-pentene and poly-4-methyl-1-pentene) and α-olefin copolymers (e.g. ethylene/propylene block or random copolymers); polyester-based resins such as polyethylene terephthalate, polybutylene terephthalate and polyhexamethylene terephthalate; polysulfide-based resins such as polyphenylene sulfide; aliphatic hydroxycarboxylic acid-based resins such as polylactic acid and polycaprolactone; linear polyamide-based resins such as polyhexamethylene adipamide; crystalline polystyrene-based resins such as syndiotactic polystyrene; and condensation resins such as polyimide, polyamide-imide, acrylic acid, methacrylic acid and nylon.

Among the above-described crystalline resins, polyolefin-based resins, polyester-based resins such as polyethylene terephthalate and polybutylene terephthalate and aliphatic hydroxycarboxylic acid-based resins such as polylactic acid, all of with which the effects of the present invention are prominent, are suitable. Particularly suitable are polypropylene-based resins such as polypropylene, ethylene/propylene block or random copolymers, α-olefin (other than ethylene)/propylene block or random copolymers and mixtures of these propylene-based polymers and other α-olefin polymers; and polyolefin-based resins such as polyethylene.

The (B) resin additive according to the present invention is a resin additive or a resin additive mixture which retains a liquid state when melted with heating to 250° C. and then cooled to 80° C. and kept for 30 minutes. Examples of the resin additive include phenolic antioxidants, phosphorus-based antioxidants, thioether-based antioxidants, hindered amine compounds, UV absorbers, phosphate-based flame retardants and mixtures thereof. Further, the resin additive masterbatch according to the present invention may also comprise a resin additive other than the resin additive which retains a liquid state when melted with heating to 250° C. and then cooled to 80° C. and kept for 30 minutes.

Examples of the phenolic antioxidant of the above-described (B) resin additive include stearyl(3,5-di-tert-butyl-4-hydroxyphenyl)propionate, thiobis(3-(3,5-di-tert-butyl-4-hydroxyphenyl)propionyloxy)ethyl, triethylene glycol-bis[(3-tert-butyl-4-hydroxy-5-methylphenyl)propionate], 2-methyl-4,6-bis(octylthiomethyl)phenol, 2,4-dimethyl-6-(1-methylpentadecyl)phenol and esters of a branched C7-9 mixed alcohol and (3,5-di-tert-butyl-4-hydroxyphenyl)propionic acid.

Examples of the phosphorus-based antioxidant of the above-described (B) resin additive include trisnonylphenyl phosphite, tridecyl phosphite, octyldiphenyl phosphite, di(decyl)monophenyl phosphite, di(tridecyl)pentaerythritol diphosphite, di(nonylphenyl)pentaerythritol diphosphite, tetra(tridecyl)isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite and 2,2'-methylenebis(4,6-tert-butylphenyl)-octadecyl phosphite.

Examples of the thioether-based antioxidant of the above-described (B) resin additive include dilauryl thiodipropionate, ditridecyl thiodipropionate, distearyl thiodipropionate, pentaerythritol tetrakis(3-dodecylthiopropionate) and 4,4-thiobis(2-tert-butyl-5-methylphenol)bis-3-(dodecylthio)propionate.

Examples of the hindered amine compound of the above-described (B) resin additive include 2,2,6,6-tetramethyl-4-piperidinol fatty acid esters; mixtures of bis(1,2,2,6,6-pentamethyl-4-piperidyl)sebacate and methyl-1,2,2,6,6- pentamethyl-4-piperidyl sebacate; tetraesters of a mixed alcohol of 1,2,2,6,6-pentamethylpiperidinol and tridecyl alcohol and butanetetracarboxylic acid; tetraesters of a mixed alcohol of 2,2,6,6-tetramethyl piperidinol and tridecyl alcohol and butanetetracarboxylic acid; bis(1-octyloxy-2,2,6,6-tetramethyl-4-piperidyl)sebacate; polyesters of 1-(2-hydroxyethyl)-2,2,6,6-tetramethyl-4-piperidinol and butanedioic acid; reaction products of 2,2,6,6-tetramethyl-4-(2-propenyloxyl)piperidine and methylhydrogen siloxane; mixtures of dodecyl-3-(2,2,4,4-tetramethyl-21-oxo-7-oxa-3,20-diazodispiro(5.1.11.2)heneicosane-20-yl)propionate and tetradecyl-3-(2,2,4,4-tetramethyl-21-oxo-7-oxa-3,20-diazodispiro(5.1.11.2)heneicosane-20-yl)propionate; mixtures of dodecyl-N-(2,2,6,6-tetramethylpiperidine-4-yl)-b-alaninate and tetradecyl-N-(2,2,6,6-tetramethylpiperidine-4-yl)-b-alaninate; 3-dodecyl-N-(2,2,6,6-tetramethylpiperidine-4-yl) succinimide; and 2-dodecyl-N-(1-acetyl-2,2,6,6-tetramethylpiperidine-4-yl).

Examples of the above-described UV absorber include salicylic acid-based UV absorbers, benzophenone-based UV absorbers, benzotriazole-based UV absorbers and cyanoacrylate-based UV absorbers, such as hexadecyl-3,5-di-tert-butyl-4-hydroxybenzoate, 2-hydroxy-4-methoxybenzoate, 2-hydroxy-4-octoxybenzoate, 2-hydroxy-4-dodecyloxybenzoate, ester of a C7-9 mixed alcohol and 3-(3-(2H-benzotriazole-2-yl)-4-hydroxy-5-tert-butylphenyl)propionic acid, ester of polyethylene glycol and 3-(3-(2H-benzotriazole-2-yl)-4-hydroxy-5-tert-butylphenyl)propionic acid, 2-(2H-benzotriazol-2-yl)-4-methyl-6-dodecylphenol (wherein the dodecyl group is a mixture of linear and branched chains), ester of octanol and 3-(3-(5-chloro-2H-benzotriazol-2-yl)-4-hydroxy-5-tert-butylphenyl)propionic acid, 2-(4-isooctyloxyphenyl)-4,6-bis(2,4-dimethylphenyl)-1,3,5-triazine, 2-(2-hydroxy-4-(3-(2-ethylhexyl-1-oxy)-2-hydroxypropyloxy) phenyl)-4,6-bis(2,4-dimethylphenyl)-1,3,5-triazine, 2'-ethylhexyl-2-cyano-3-phenylcinnamate and N-(2-ethoxyphenyl)-N'-(4-isododecylphenyl)oxamide.

Examples of the phosphate-based flame retardant of the above-described (B) resin additive include phosphate compounds and condensed phosphate compounds and more specific examples include 2-ethylhexyldiphenyl phosphate, resorcinol-bis(diphenylphosphate) and bisphenol A-bis(diphenylphosphate).

The above-described (B) resin additive according to the present invention may be an individual compound or may be a mixture of the above-described compounds. In the case of a compound whose starting materials are an aliphatic alcohol and a fatty acid, the above-described (B) resin additive may be a mixture such as a mixed ester compound obtained from a mixed alcohol and mixed fatty acid (an ester compound having mixed groups) or a mixed amide compound (an amide compound having mixed groups).

The above-described (B) resin additive compound according to the present invention is blended in an amount of 100 to 900 parts by mass, preferably 150 to 600 parts by mass, with respect to 100 parts by mass of the (A) crystalline resin. When the amount is less than 100 parts by mass, the merits of a highly concentrated resin masterbatch are small, while when the amount is greater than 900 parts by mass, the added compound becomes likely to exude, causing caking of the masterbatch and lowering the storage stability.

As the (C) metal salt of an organic acid other than fatty acid according to the present invention, any metal salt of an organic acid other than fatty acid can be used with no particular restriction. For example, aromatic phosphates, aromatic carboxylates, alicyclic carboxylates, sulfonic acid amides and aromatic sulfonates can be suitably used and thereamong, aromatic phosphates, aromatic carboxylates and alicyclic carboxylates, which are represented by any one of the above-described Formulae (1) to (4), can be more suitably used.

Further, examples of the metal in the above-described (C) metal salt of an organic acid other than fatty acid include alkali metals, alkaline earth metals, aluminum, titanium, manganese, iron, zinc, silicon, zirconium, yttrium and hafnium.

Examples of the $C_1$ to $C_8$ alkyl group represented by $R^1$ to $R^4$ in the above-described Formula (1) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl and tert-octyl. Thereamong, from the standpoint of the effects of the present invention, $C_1$ to $C_5$ alkyl groups are preferred and tert-butyl group is particularly preferred.

Examples of the $C_1$ to $C_4$ alkanediyl group represented by X in the above-described Formula (1) include methanediyl group, ethanediyl group, propanediyl group and butanediyl group. Thereamong, from the standpoint of the effects of the present invention, methanediyl group and ethanediyl group are preferred.

In the above-described Formula (1), $M^1$ represents an alkali metal, an alkaline earth metal or aluminum. Examples of the alkali metal include sodium, potassium and lithium and examples of the alkaline earth metal include magnesium, calcium, strontium and barium. Thereamong, sodium, lithium, magnesium, calcium and aluminum are preferred since these are inexpensive and exhibit prominent use effects, and sodium, lithium and aluminum are more preferred.

More specific examples of the compound represented by the above-described Formula (1) include the following Compound Nos. 1 to 4. However, the present invention is not restricted to the following compounds by any means.

Compound No. 1

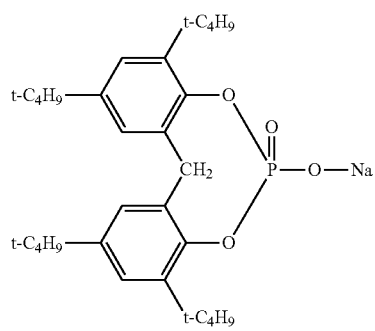

Compound No. 2

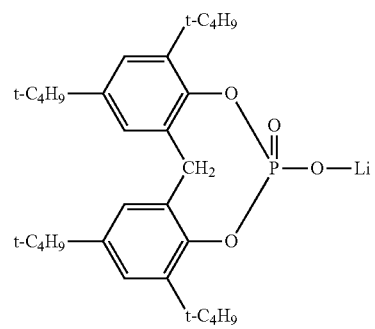

Compound No. 3

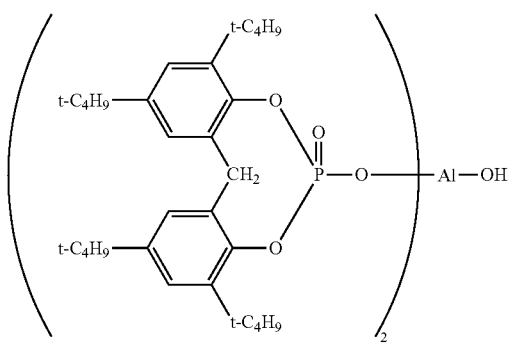

Compound No. 4

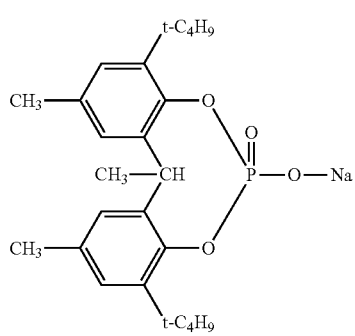

In the above-described Formula (2), $R^5$ represents a hydrogen atom or a $C_1$ to $C_8$ alkyl group, and examples of the $C_1$ to $C_8$ alkyl group include the same groups as those exemplified for $R^1$ to $R^4$ of the above-described Formula (1). Thereamong, from the standpoint of the effects of the present invention, a hydrogen atom and a tert-butyl group are particularly preferred.

In the above-described Formula (2), $M^2$ represents an alkali metal, an alkaline earth metal or aluminum, and examples of the alkali metal and alkaline earth metal include the same metals as those exemplified for $M^1$ of the above-described Formula (1). Thereamong, sodium, lithium, magnesium, calcium and aluminum are preferred since they are inexpensive and exhibit prominent use effects, and sodium, calcium and aluminum are more preferred.

More specific examples of the compound represented by the above-described Formula (2) include sodium benzoate, potassium benzoate, lithium benzoate, calcium benzoate, magnesium benzoate, barium benzoate and aluminum tris(p-t-butyl benzoate). From the standpoints of the cost and the effects of the present invention, sodium benzoate and aluminum tris(p-t-butyl benzoate) are preferred.

In the above-described Formula (3) according to the present invention, $M^3$ and $M^4$ each represent an alkali metal. Among alkali metals, sodium, potassium and lithium are preferred.

More specific examples of the compound represented by the above-described Formula (3) include the following Compound No. 5. However, the present invention is not restricted thereto by any means.

Compound No. 5

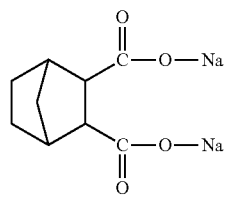

In the above-described Formula (4) according to the present invention, $R^6$ to $R^8$ each independently represent a hydrogen atom or a $C_1$ to $C_8$ alkyl group, and examples of the $C_1$ to $C_8$ alkyl group include the same groups as those exemplified for $R^1$ to $R^4$ of the above-described Formula (1). Thereamong, from the standpoint of the effects of the present invention, in particular, those compounds in which $R^6$ is an isopropyl group and those compound in which $R^7$ and $R^8$ are methyl groups are preferred.

In the above-described Formula (4) according to the present invention, $M^5$ represents an alkali metal or an alkaline earth metal. Examples of the alkali metal and alkaline earth metal include the same metals as those exemplified for $M^1$. Thereamong, sodium, potassium, magnesium and calcium are preferred.

More specific examples of the compound represented by the above-described Formula (4) include the following Compound Nos. 6 and 7. However, the present invention is not restricted to the following compounds by any means.

Compound No. 6

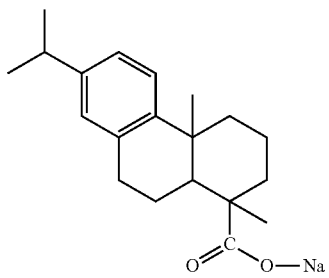

Compound No. 7

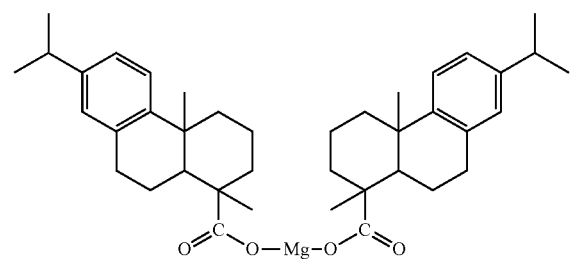

Further, as the above-described sulfonic acid amide which can be suitably used as the (C) metal salt of an organic acid other than fatty acid, for example, a compound represented by the following Formula (8) or (9) may be employed:

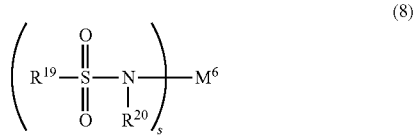

(wherein, $R^{19}$ and $R^{20}$ each independently represent a hydrogen atom, a halogen atom, an alkali metal atom, an amino group, a $C_1$ to $C_{10}$ alkyl group which is optionally branched or substituted, a $C_1$ to $C_{10}$ alkoxy group which is optionally branched or substituted, or a $C_3$ to $C_{30}$ cyclic group which is optionally substituted; $R^{19}$ and $R^{20}$ may be bound to form a cyclic group; s represents a number of 1 or 2; when s is 1, $M^6$ represents an alkali metal atom or $Al(OH)_{3-s}$; and when s is 2, $M^6$ represents a divalent metal atom (magnesium, calcium, strontium, barium, titanium, manganese, iron, zinc, silicon, zirconium, yttrium or hafnium), $Al(OH)_{3-s}$ or a linking group (a $C_1$ to $C_{12}$ alkylene group, a $C_2$ to $C_{12}$ alkenylene group, a $C_3$ to $C_8$ cycloalkylene group, a $C_4$ to $C_{20}$ alkylene group having an ether bond, a $C_5$ to $C_{20}$ alkylene group interrupted by a cycloalkylene group, a $C_6$ to $C_{12}$ arylene group or a mixture these groups))

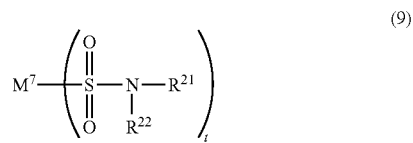

(wherein, $R^{21}$ and $R^{22}$ represent the same groups as the above-described $R^{19}$ and $R^{20}$; and t and $M^7$ represent the same as s and $M^6$ in the above-described Formula (8), respectively).

Examples of the $C_1$ to $C_{10}$ branched or linear alkyl group which is optionally branched or substituted and represented by $R^{19}$ and $R^{20}$ in the above-described Formula (8) include methyl, ethyl, propyl, isopropyl, butyl, isobutyl, sec-butyl, tert-butyl, amyl, isoamyl, tert-amyl, hexyl, heptyl, octyl, isooctyl, 2-ethylhexyl, tert-octyl, nonyl and decyl. In the alkyl group, an arbitrary —$CH_2$— is optionally substituted with —O—, —CO—, —COO— or —$SiH_2$— and some or all of the hydrogen atoms are also optionally substituted with a halogen atom such as fluorine, chlorine, bromine or iodine, —$SO_2$—$NR^{20-1}$-$M^{6-1}$, —$NM^{6-1}$-$SO_2$—$R^{19-1}$ or the like (wherein, $R^{19-1}$, $R^{20-1}$ and $M^{6-1}$ represent the same substituents represented by $M^6$, $R^{19}$ and $R^{20}$ in the above-described Formula (8), respectively).

Examples of the $C_1$ to $C_{10}$ branched or linear alkoxy group which is optionally branched or substituted and represented by $R^{19}$ and $R^{20}$ in the above-described Formula (8) include methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy and decyloxy. In the alkoxy group, an arbitrary —$CH_2$— is optionally substituted with —O—, —CO—, —COO— or —$SiH_2$— and some or all of the hydrogen atoms are also optionally substituted with a halogen atom such as fluorine, chlorine, bromine or iodine, a cyano group, —$SO_2$—$NR^{20-1}$-$M^{6-1}$, —$NM^{6-1}$-$SO_2$—$R^{19-1}$ or the like (wherein, $R^{19-1}$, $R^{20-1}$ and $M^{6-1}$ represent the same substituents represented by $M^6$, $R^{19}$ and $R^{20}$ in the above-described Formula (8), respectively).

The $C_3$ to $C_{30}$ cyclic group represented by $R^{19}$ and $R^{20}$ in the above-described Formula (8) may be a monocyclic ring, a polycyclic ring, a fused ring or an assembled ring, and an aromatic cyclic group or a saturated aliphatic cyclic group may be used indiscriminately. The carbon atoms of the ring are optionally substituted with an oxygen atom, a nitrogen atom, a sulfur atom or the like and some or all of the hydrogen atoms of the ring are also optionally substituted with a $C_1$ to $C_5$ alkyl group, a $C_1$ to $C_5$ alkoxy group, an amino group, a halogen atom, —$SO_2$—$NR^{20-1}$-$M^{6-1}$ and $M^{6-1}$, —$NM^{6-1}$-$SO_2$—$R^{19-1}$ or the like (wherein, $R^{19-1}$, $R^{20-1}$ and $M^{6-1}$ represent the same substituents represented by $M^6$, $R^{19}$ and $R^{20}$ in the above-described Formula (8), respectively). Examples of the $C_3$ to $C_{30}$ cyclic group include pyrrole, furan, thiophene, imidazole, pyrazole, oxazole, isoxazole, thiazole, isothiazole, pyridine, pyridazine, pyrimidine, pyrazine, piperidine, piperazine, morpholine, phenyl, naphthyl, anthracene, biphenyl, triphenyl, 2-methylphenyl (o-tolyl, cresyl), 3-methylphenyl (m-tolyl), 4-methylphenyl (p-tolyl), 4-chlorophenyl, 4-hydroxyphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl(xylyl), 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, cyclohexylphenyl, biphenyl, 2,4,5-trimethylphenyl(mesityl), 4-aminophenyl, 5-dimethylaminonaphthyl, 6-ethoxy-benzothiazolyl, 2,6-dimethoxy-4-pyrimidinyl, 5-methyl-1,3,4-thiadiazole-2-yl, 5-methyl-3-isoxazolyl and 1,2-benzisothiazol-3(2H)-one-1,1-dioxide. Thereamong, phenyl, 4-aminophenyl and pyridine are particularly preferred. Further, examples of the cyclic group which $R^{19}$ and $R^{20}$ are bound to form include the same groups as those described in the above and it is preferably 1,2-benzisothiazol-3(2H)-one-1,1-dioxide.

In the above-described Formula (8), when s is 1, $M^6$ is a halogen atom, an alkali metal atom or $Al(OH_2)_2$. Thereamong, an alkali metal atom is more preferred, and as the alkali metal atom, sodium atom is particularly preferred since the effects of the invention are prominent.

Examples of the $C_1$ to $C_{12}$ alkylene group represented by $M^6$ in the above-described Formula (8) include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, decylene, dodecylene, ethane-1,1-diyl and propane-2,2-diyl.

Examples of the $C_2$ to $C_{12}$ alkenylene group represented by $M^6$ in the above-described Formula (8) include vinylene, 1-methylethenylene, 2-methylethenylene, propenylene, butenylene, isobutenylene, pentenylene, hexenylene, heptenylene, octenylene, decenylene and dodecenylene.

Examples of the $C_3$ to $C_8$ cycloalkylene group represented by $M^6$ in the above-described Formula (8) include cyclopropylene, 1,3-cyclobutylene, 1,3-cyclopentylene, 1,4-cyclohexylene and 1,5-cyclooctylene.

Examples of the $C_4$ to $C_{20}$ alkylene group having an ether bond, which is represented by $M^6$ in the above-described Formula (8), include those alkylene groups having an ether bond in the carbon chain or at a terminal thereof and the alkylene groups may have only one ether bond or a plurality of ether bonds in series.

Examples of the $C_5$ to $C_{20}$ alkylene group interrupted by a cycloalkylene group, which is represented by $M^6$ in the above-described Formula (8), include those alkylene groups having the above-described cycloalkylene group in the carbon chain or at a terminal thereof.

Examples of the $C_6$ to $C_{12}$ arylene group represented by $M^6$ in the above-described Formula (8) include aromatic cyclic groups such as 1,4-phenylene, 1,5-naphthalene, 2,6-naphthalene and biphenyl group, and such aromatic cyclic groups are optionally substituted as well.

Preferred examples of the sulfonamide compound represented by the above-described Formula (8) include the following Compound Nos. 8 to 10.

Compound No. 8

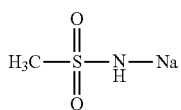
No. 8

Compound No. 9

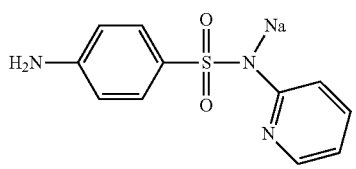
No. 9

Compound No. 10

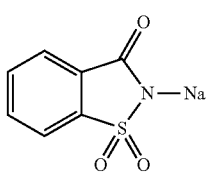
No. 10

Further, examples of an aromatic sulfonate which can be suitably used as the above-described (C) metal salt of an organic acid other than fatty acid include compounds represented by the following Formula (10):

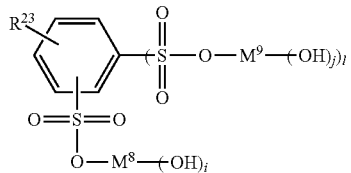
(10)

(wherein, $M^8$ and $M^9$ each represent an alkali metal, an alkaline earth metal or aluminum; 1 is 0 or 1; in cases where 1 is 0, i represents 0 when $M^8$ is an alkali metal, 1 when $M^8$ is an alkaline earth metal, or 2 when $M^8$ is aluminum; in cases where 1 is 1, i and j represent 0 when $M^8$ and $M^9$ are each an alkali metal, 1 when $M^8$ and $M^9$ are each independently an alkaline earth metal, 0 when $M^8$ and $M^9$ are the same alkaline earth metal atom (that is, when a ring structure of $-S(=O)_2-O-M^8-O-S(=O)_2-$ is formed), 2 when $M^8$ and $M^9$ are each independently aluminum, or 1 and 0, respectively, when $M^8$ and $M^9$ are the same aluminum (that is, when a ring structure of $-S(=O)_2-O-Al(OH)-O-S(=O)_2-$ is formed; and $R^{23}$ represents a hydrogen atom or a $C_1$ to $C_8$ alkyl group).

In above-described Formula (10), $R^{23}$ represents a hydrogen atom or a $C_1$ to $C_8$ alkyl group, and examples of the $C_1$ to $C_8$ alkyl group include the same groups as those exemplified for $R^1$ to $R^4$ of the above-described Formula (1).

Examples of $M^8$ and $M^9$ in the above-described Formula (10) include the same metals as those exemplified for $M^2$ of the above-described Formula (2).

More specific examples of the above-described Formula (10) include sodium benzenesulfonate.

The (D) gelling agent according to the present invention is not particularly restricted and any common gelling agent used as a resin gelling agent may be employed. Examples of such gelling agent include benzylated compounds and acetal compounds of sorbitol, mannitol, xylitol and pentaerythritol; sorbitol-based compounds represented by the above-described Formula (5); 12-hydroxystearic acid-based compounds such as 12-hydroxystearic acid and metal salts of 12-hydroxystearic acid; amide compounds such as N-acylamino acid derivatives, bisamide compounds and triamide compounds; dialkyl/diphenyl urea derivatives; cholesterol derivatives; fatty acid metal salts; and melamines, and an alicyclic carboxylic acid metal salt compound represented by the above-described Formula (4) may also be suitably employed as the gelling agent. Thereamong, a sorbitol-based compound represented by the above-described Formula (5) or a 12-hydroxystearic acid-based compound is preferably employed.

In the above-described Formula (5), $R^9$ to $R^{13}$ each represent a hydrogen atom, a halogen atom or a $C_1$ to $C_4$ alkyl group. Examples of the halogen atom include the same ones as those exemplified for $R^{19}$ and $R^{20}$ of the above-described Formula (8) and examples of the $C_1$ to $C_4$ alkyl group include methyl, ethyl, propyl, isopropyl, butyl, isobutyl, sec-butyl and tert-butyl groups.

Further, more specific examples of the compound represented by the above-described Formula (5) include the following Compound Nos. 11 to 15. However, the present invention is not restricted to the following compounds by any means.

Compound No. 11

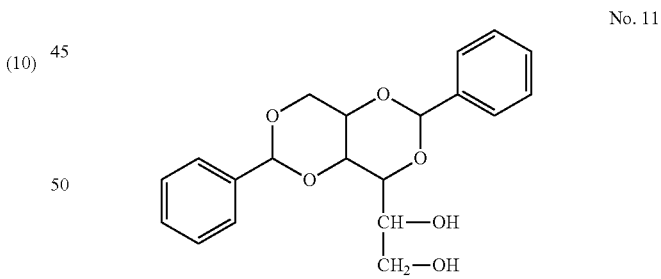
No. 11

Compound No. 12

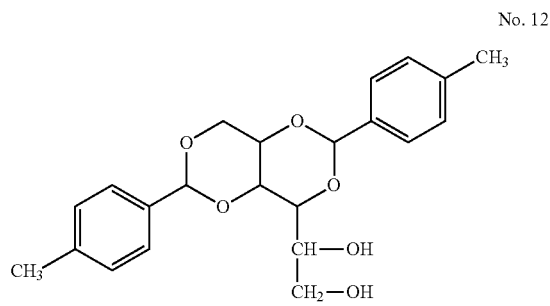
No. 12

Compound No. 13

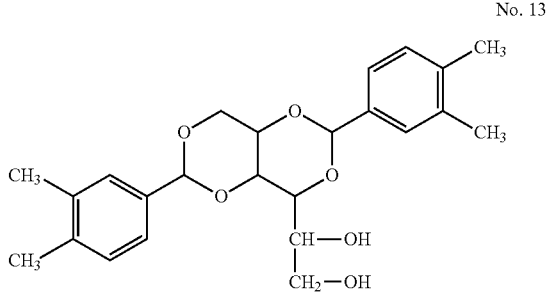

Compound No. 14

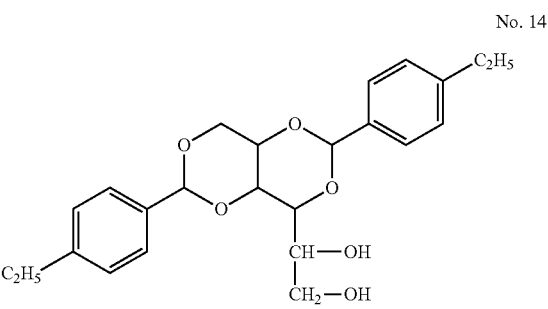

Compound No. 15

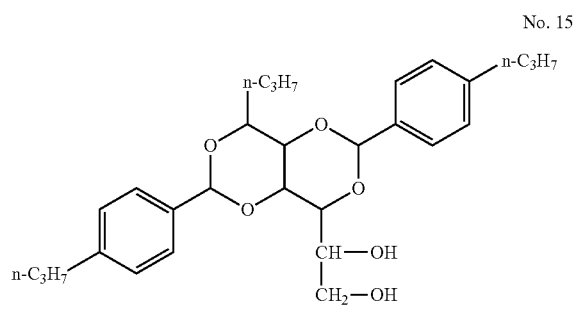

Further, examples of the above-described amide compounds that are suitable as the (D) gelling agent according to the present invention include compounds represented by the following Formula (11):

$$R^{24}—(CONH—R^{25})_u \qquad (11)$$

(wherein, $R^{24}$ represents a $C_1$ to $C_{25}$ saturated or unsaturated aliphatic, alicyclic or aromatic polycarboxylic acid residue (that is, a group obtained by removing —C(=O)—OH from a polycarboxylic acid); $R^{25}$ represents a $C_1$ to $C_{18}$ alkyl group or alkenyl group, or an optionally-substituted $C_3$ to $C_{12}$ cycloalkyl group, $C_5$ to $C_{12}$ cycloalkenyl group, phenyl group, naphthyl group or anthryl group; and u represents an integer of 3 to 6).

Examples of the polycarboxylic acid in the $C_1$ to $C_{25}$ saturated or unsaturated aliphatic polycarboxylic acid residue represented by $R^{24}$ in the above-described Formula (11) include methanetricarboxylic acid, tricarballylic acid, propanetricarboxylic acid, pentanetricarboxylic acid, ethanetetracarboxylic acid, propanetetracarboxylic acid, pentanetetracarboxylic acid, butanetetracarboxylic acid (particularly, 1,2,3,4-butanetetracarboxylic acid), dodecanetetracarboxylic acid, pentanepentacarboxylic acid, tetradecanehexacarboxylic acid, ethylenediamine tetraacetic acid, nitrilotriacetic acid, ethylene glycol-bis(β-aminoethylether)N,N,N',N'-tetraacetic acid, diethylenetriamine pentaacetic acid, N-hydroxyethylethylenediamine-N,N',N'-triacetic acid, 1,3-diaminopropane-2-ol-N,N,N',N'-tetraacetic acid, 1,2-diaminopropane-N,N,N',N'-tetraacetic acid, triethylenetetraminehexaacetic acid, nitrilotripropionic acid, 1,6-hexanediamine tetraacetic acid and N-(2-carboxyethyl)iminodiacetic acid.

Examples of the $C_1$ to $C_{25}$ saturated or unsaturated alicyclic polycarboxylic acid represented by $R^{24}$ in the above-described Formula (11) include cyclohexanetricarboxylic acid, cyclobutanetetracarboxylic acid, cyclopentanetetracarboxylic acid, cyclohexanetetracarboxylic acid, tetrahydrofurantetracarboxylic acid, 5-(succinic acid)-3-methyl-3-cyclohexene-1,2-dicarboxylic acid, bicyclo[2.2.2]octa-7-ene-2,3,5,6-tetracarboxylic acid, cyclohexanehexacarboxylic acid, 5,6,9,10-tetracarboxytricyclo[6.2.2.0$^{2,7}$]dodeca-2,11-diene and lower-alkyl substitution products thereof (for example, those substituted with methyl at the 3-, 8-, 11- or 12-position), 1,2-cyclohexanediaminetetraacetic acid, 2,3,5-tricarboxycyclopentylacetic acid, 6-methyl-4-cyclohexene-1,2,3-tricarboxylic acid, 3,5,6-tricarboxynorbornene-2-acetic acid, thiobis(norbornene-2,3-dicarboxylic acid), bicyclo[4.2.0]octane-3,4,7,8-tetracarboxylic acid, 1,1'-bicyclopropane-2,2',3,3'-tetracarboxylic acid, 1,2-bis(2,3-dimethyl-2,3-dicarboxycyclobutyl)ethane, pyrazine-2,3,5,6-tetracarboxylic acid, tricyclo[4.2.2.0$^{2,5}$]decane-9-ene-3,4,7,8-tetracarboxylic acid, 3,4-dicarboxy-1,2,3,4-tetrahydro-1-naphthalenesuccinic acid and lower-alkyl substitution products thereof (for example, those substituted with methyl at the 1-, 5-, 6- or 7-position), and 1,2,3,4,5,6,12,13-octahydrophenanthrene-3,4,5,6-tetracarboxylic acid.

Examples of the $C_1$ to $C_{25}$ aromatic polycarboxylic acid represented by $R^{24}$ in the above-described Formula (11) include benzenetricarboxylic acid, benzenetetracarboxylic acid, benzophenonetetracarboxylic acid, biphenyltetracarboxylic acid, biphenylether tetracarboxylic acid, diphenylsulfonetetracarboxylic acid, diphenylmethanetetracarboxylic acid, perylenetetracarboxylic acid, naphthalenetetracarboxylic acid, 4,4'-dinaphthalic acid, benzidine-3,3'-dicarboxyl-N,N-tetraacetic acid, diphenylpropanetetracarboxylic acid, anthracenetetracarboxylic acid, phthalocyaninetetracarboxylic acid, ethylene glycol-trimellitic acid diester, benzenehexacarboxylic acid and glycerintrimellitic acid triester.

Examples of the $C_1$ to $C_{18}$ alkyl group represented by $R^{25}$ in the above-described Formula (11) include methyl, ethyl, propyl, isopropyl, butyl, sec-butyl, tert-butyl, pentyl, tert-pentyl, hexyl, heptyl, octyl, isooctyl, tert-octyl, 2-ethylhexyl, nonyl, isononyl, decyl, isodecyl, undecyl, dodecyl, tridecyl, tetradecyl, pentadecyl, hexadecyl, heptadecyl and octadecyl.

Further, examples of the $C_1$ to $C_{18}$ alkenyl group represented by $R^{25}$ in the above-described Formula (11) include vinyl, propenyl, butenyl, octenyl and oleyl.

Further, examples of the $C_3$ to $C_{12}$ cycloalkyl group represented by $R^{25}$ in the above-described Formula (11) include saturated carbon rings such as cyclopropyl group, cyclopentyl group, cyclohexyl group, cycloheptyl group, cyclooctyl group, cyclononyl group and cyclodecyl group.

Further, examples of the $C_5$ to $C_{12}$ cycloalkenyl group represented by $R^{25}$ in the above-described Formula (11) include cyclopentenyl group, cyclohexenyl group, cycloheptenyl group, cyclooctenyl group, cyclononenyl group, cyclodecenyl group, cycloundecenyl group and cyclododecenyl group.

More specific examples of the compound represented by the above-described Formula (11) include the following Compound Nos. 16 to 18.

Compound No. 16

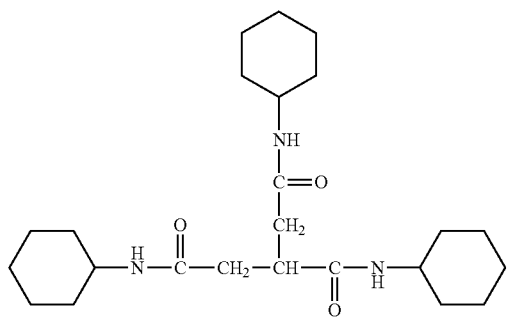
No. 16

Compound No. 17

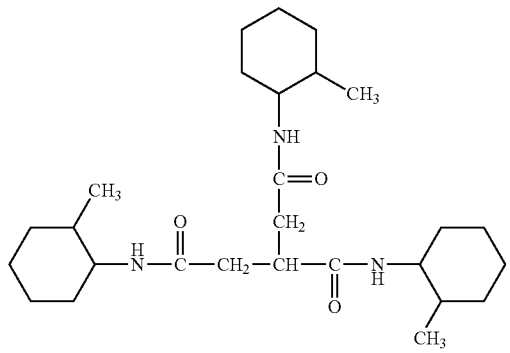
No. 17

Compound No. 18

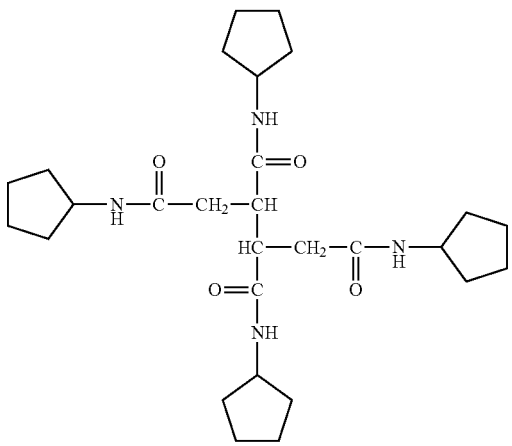
No. 18

Examples of the $C_1$ to $C_4$ alkyl group represented by $R^{14}$ in the above-described Formula (6) include the same groups as those exemplified for the $C_1$ to $C_4$ alkyl group of the above-described Formula (5). Further, an arbitrary hydrogen atom of these alkyl groups is optionally substituted with a hydroxy group as well.

Examples of the $C_1$ to $C_4$ alkoxy group represented by $R^{14}$ in the above-described Formula (6) include methoxy, ethoxy, propoxy, butoxy and t-butoxy groups. Further, an arbitrary hydrogen atom of these alkoxy groups is optionally substituted with a hydroxy group as well.

Examples of the $C_1$ to $C_4$ alkanoyl group represented by $R^{14}$ in the above-described Formula (6) include those groups having a structure in which —OH is removed from formic acid, acetic acid, propanoic acid or butanoic acid. Further, examples of the alkanoyloxy group include those groups having a structure in which H is removed from —OH of formic acid, acetic acid, propanoic acid or butanoic acid.

Further, examples of the $C_5$ to $C_{21}$ alkyl group represented by $R^{15}$ in the above-described Formula (6) include, in addition to those alkyl groups exemplified for the above-described Formula (11), groups such as nonadecyl, eicosyl and heneicosyl.

More specific examples of the compound represented by the above-described Formula (6) include the following Compound Nos. 19 and 20. However, the present invention is not restricted to the following compounds by any means.

Compound No. 19

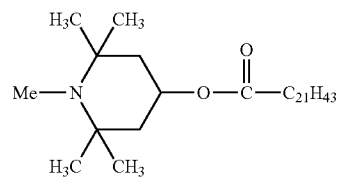
No. 19

Compound No. 20

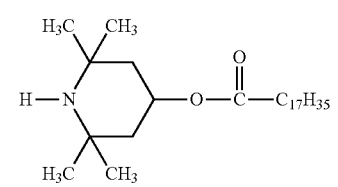
No. 20

Examples of the $C_1$ to $C_8$ alkyl group represented by $R^{16}$ and $R^{17}$ in the above-described Formula (7) include the same groups as those exemplified for the alkyl group of the above-described Formula (1).

Further, examples of the $C_1$ to $C_{30}$ alkyl group represented by $R^{18}$ in the above-described Formula (7) include, in addition to those alkyl groups exemplified for the above-described Formulae (6) and (11), docosyl, tricosyl, tetracosyl, pentacosyl, hexacosyl, heptacosyl, octacosyl, nonacosyl and triacosyl.

Further, more specific examples of the compound represented by the above-described Formula (7) include the following Compound Nos. 21 and 22. However, the present invention is not restricted to the following compounds by any means.

Compound No. 21

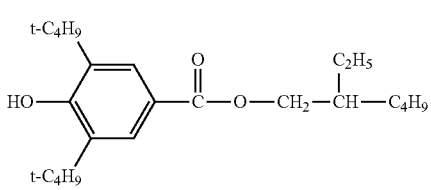
No. 21

-continued

Compound No. 22

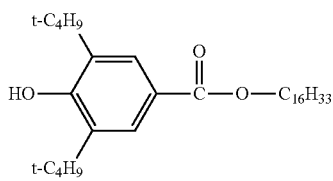

No. 22

The (E) agent for lowering the melting point of the gelling agent according to the present invention is not particularly restricted and examples thereof include hydroxypolycarboxylic acids, carboxylic acids, sulfonates, sulfates and fatty acid aluminum salts.

Examples of the above-described hydroxypolycarboxylic acids include $C_3$ to $C_{22}$ di-, tri- and tetra-carboxylic acids having 1 to 3 hydroxyl groups, and specific examples thereof include tartaric acid, lactic acid, malic acid, citric acid, gluconic acid, pantothenic acid, 12-hydroxystearic acid, mandelic acid, cholic acid, β-oxynaphthoic acid, ricinoleic acid, quinic acid, shikimic acid, salicylic acid and α,β-dihydroxyhexahydrophthalic acid.

Examples of the above-described carboxylic acids include $C_3$ to $C_{22}$ mono-, di-, tri- and tetracarboxylic acids having 1 to 4 carboxylic acid groups, and specific examples thereof include lauric acid, tridecanoic acid, myristic acid, pentadecanoic acid, palmitic acid, heptadecanoic acid, stearic acid, isostearic acid, eicosanoic acid, behenic acid, docosanoic acid, montanic acid, benzilic acid, sorbic acid, oleic acid, linoleic acid, linolenic acid, succinic acid, glutaric acid, malonic acid, adipic acid, suberic acid, azelaic acid, sebacic acid, dodecanedioic acid, itaconic acid, tricarballylic acid, 1,2,3,4-butanetetracarboxylic acid, citrazinic acid, 1,2,3,4-cyclopentanetetracarboxylic acid, 1,4-cyclohexanedicarboxylic acid, 1,2-cyclohexanedicarboxylic acid, 4,4'-dicyclohexyldicarboxylic acid, cyclohexanetetracarboxylic acid, L-glutamic acid and L-glutamine.

Examples of the above-described sulfonates include sodium salts and potassium salts of sulfonic acid selected from the group consisting of alkane ($C_8$ to $C_{14}$) sulfonic acids, alkyl ($C_8$ to $C_{22}$) benzenesulfonic acids, alkyl ($C_8$ to $C_{22}$) naphthalenesulfonic acids, alkyl ($C_8$ to $C_{22}$) sulfosuccinic acids, α-olefin sulfonic acids ($C_8$ to $C_{30}$) and N-acyl ($C_8$ to $C_{22}$) methyltaurines, and preferred examples include alkylbenzenesulfonic acid salts or alkylnaphthalenesulfonic acid salts, whose alkyl group has 8 to 14 carbon atoms; $C_{12}$ to $C_{22}$ alkanesulfonic acid salts or $C_{12}$ to $C_{22}$ alkenesulfonic acid salts; and dialkylsulfosuccinic acid salts whose alkyl moiety is a $C_3$ to $C_{12}$ alkyl group, a cyclohexyl group, a $C_1$ to $C_3$ alkyl-substituted cyclohexyl group or the like. Examples of the salts include alkali metal salts such as lithium salts, sodium salts and potassium salts; alkaline earth metal salts such as calcium salts and magnesium salts; and ammonium salts.

Examples of the above-described sulfates include sodium salts and potassium salts of sulfuric acid ester selected from the group consisting of sulfated castor oils, higher alcohol ($C_8$ to $C_{12}$) sulfuric acid esters, polyoxyethylene (1 to 5 moles) alkyl ($C_8$ to $C_{22}$) ether sulfuric acids, polyoxyethylene (1 to 5 moles) alkyl ($C_7$ to $C_{22}$) phenylether sulfuric acids, monofatty acid ($C_8$ to $C_{22}$) glyceryl sulfates and sulfuric acid esters of fatty acid ($C_8$ to $C_{22}$) alkylol ($C_1$ to $C_6$) amides. Preferred examples include sulfuric acid ester salts of saturated or unsaturated aliphatic alcohols and sulfuric acid ester salts of ethylene oxide adducts of saturated or unsaturated aliphatic alcohols (the number of moles of added ethylene oxide: 1 to 10). Examples of the saturated or unsaturated aliphatic alcohols include those having 4 to 30 carbon atoms, particularly those having 6 to 30 carbon atoms, preferably those having 8 to 20 carbon atoms. Further, the above-described unsaturated aliphatic alcohols preferably have 1 to 3 unsaturated bonds (particularly, double bonds) in the molecule. Examples of the salts include alkali metal salts such as lithium salts, sodium salts and potassium salts; alkaline earth metal salts such as calcium salts and magnesium salts; and ammonium salts.

Examples of the above-described fatty acid aluminum salts include mono-, di- and tri-($C_6$ to $C_{30}$ fatty acid) aluminum salts, particularly di- and mono-(carboxylic acid) aluminum salts, such as aluminum di- and mono-(pelargonate), aluminum di- and mono-(laurate), aluminum di- and mono-(myristate), aluminum di- and mono-(stearate) and aluminum di- and mono-(oleate).

When the resin additive masterbatch according to the present invention is blended to a resin, the blending method is not particularly restricted and a known blending technique is employed. Any of a method in which the resin additive masterbatch is added to the polymerization system in advance before polymerizing a synthetic resin, a method in which the resin additive masterbatch is added during the polymerization and a method in which the resin additive masterbatch is added after the polymerization can be employed. Further, in cases where the resin additive masterbatch is added after the polymerization, there is, for example, a method in which the resin additive masterbatch according to the present invention is mixed with powder or a pellet of a synthetic resin which does not contain the resin additive masterbatch using a Henschel mixer or the like and the resultant is then kneaded using an extruder or the like. Here, the type of the processing machine to be used, the processing temperature, the cooling conditions after processing and the like are also not particularly restricted and it is preferred to select conditions under which the resulting resin can attain physical properties suitable for the intended use. Moreover, the resin additive masterbatch according to the present invention may be used in the form of granules individually or in combination with other additive(s).

When the resin additive masterbatch according to the present invention is blended to a resin, the mass ratio thereof is usually 0.01 to 20 parts by mass, preferably 0.05 to 10 parts by mass, with respect to 100 parts by mass of the resin.

In cases where the resin additive masterbatch according to the present invention is used for stabilization of a resin, various additives that are usually added to a variety of resins may be used in combination as required. These additives may be the same as or different from the compounds represented by the above-described Formulae (1) to (11) that are used in the resin additive masterbatch according to the present invention. Examples of the various additives include phenolic antioxidants, sulfur-based antioxidants, phosphorus-based antioxidants, UV absorbers, hindered amine compounds, nucleating agents, flame retardants, flame retardant aids, hydrotalcites, lubricants, fillers, fibrous fillers, antistatic agents, metallic soaps, pigments and dyes.

Examples of the above-described phenolic antioxidants include 2,6-di-tert-butyl-p-cresol, 2,6-diphenyl-4-octadecyloxyphenol, distearyl(3,5-di-tert-butyl-4-hydroxybenzyl) phosphonate, 1,6-hexamethylenebis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis (4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, thiodiethylene glycol-bis[(3,5-di-tert-butyl-4-hydroxyphenyl)propionate], 1,6-hexamethylenebis[(3,5-di-tert-butyl-4-hydroxyphenyl)propionate], bis[3,3-bis(4-hydroxy-3-tert-butylphenyl)butylic acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5] undecane and triethylene glycol-bis[(3-tert-butyl-4-hydroxy-5-methylphenyl)propionate]. The phenolic antioxidant is used in an amount of 0.001 to 10 parts by mass, more preferably 0.01 to 5 parts by mass, with respect to 100 parts by mass of the resin.

Examples of the above-described sulfur-based antioxidants include dialkyl thiodipropionates such as dilauryl thiodipropionate, dimyristyl thiodipropionate and distearyl thiodipropionate; and β-alkylmercaptopropionates of polyols such as pentaerythritol tetra(β-dodecylmercaptopropionate). The sulfur-based antioxidant is used in an amount of 0.001 to 10 parts by mass, more preferably 0.01 to 5 parts by mass, with respect to 100 parts by mass of the resin.

Examples of the above-described phosphorus-based antioxidants include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidene diphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-tert-butylphenyl)-2-ethylhexyl phosphite, 2,2'-methylenebis(4,6-tert-butylphenyl)-octadecyl phosphite, 2,2'-ethylidenebis(4,6-di-tert-butylphenyl)fluorophosphite, tris(2-[(2,4,8,10-tetrakistert-butyldihenzo[d,f][1,3,2]dioxaphosphepine-6-yl)oxy]ethyl)amine and phosphates of 2-ethyl-2-butylpropylene glycol and 2,4,6-tri-tert-butylphenol. The above-described phosphorus-based antioxidant is used in an amount of 0.001 to 10 parts by mass, more preferably 0.01 to 5 parts by mass, with respect to 100 parts by mass of the resin.

Examples of the above-described UV absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines such as 2-(2-hydroxy-4-octoxyphenyl)-4,6-bis(2,4-di-tert-butylphenyl-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. The above-described UV absorber is used in an amount of 0.001 to 10 parts by mass, more preferably 0.01 to 5 parts by mass, with respect to 100 parts by mass of the resin.

Examples of the above-described hindered amine compounds include 2,2,6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl) sebacate, bis(1,2,2,6,6-pentamethyl-4-piperidyl)sebacate, tetrakis(2,2,6,6-tetramethyl-4-piperidyl)butane tetracarboxylate, tetrakis(1,2,2,6,6-pentamethyl-4-piperidyl)butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylaminoundecane and 1,6,11-tris[2,4-bis(N-butyl-N-(1,2,2,6,6-pentamethyl-4-piperidyl)amino)-s-triazine-6-ylaminoundecane.

Examples of the above-described nucleating agents include aromatic carboxylic acid metal salts such as aluminum p-t-butyl benzoate and sodium benzoate; alicyclic carboxylic acid metal salts such as disodium-bicyclo[2,2,1]heptane-2,3-dicarboxylate; acidic metal phosphates such as sodium bis(2,4-di-tert-butylphenyl)phosphate, lithium bis(2,4-di-tert-butylphenyl)phosphates and sodium-2,2'-methylenebis(4,6-di-tert-butylphenyl)phosphate; and polyhydric alcohol derivatives such as dibenzylidene sorbitol and bis (methylbenzylidene)sorbitol.

Examples of the above-described halogen-based flame retardants; phosphorus-based flame retardants such as red phosphorus, melamine phosphate, guanidine phosphate, phosphate compounds and phosphazene compounds; nitrogen-based flame retardants such as melamine cyanurate; and metal hydroxides such as magnesium hydroxide and aluminum hydroxide. Examples of the flame retardant aids include inorganic compounds such as antimony trioxide and zinc borate; and anti-dripping agents such as polytetrafluoroethylenes.

The above-described hydrotalcites may be either naturally occurring products or synthetic products and may be used regardless of whether or not they have been subjected to a surface treatment and have crystal water. Examples of such hydrotalcites include basic carbonates represented by the following Formula (12):

$$M_xMg_yAl_zCO_3(OH)_{xp+2y+3z-2} \cdot nH_2O \qquad (12)$$

(wherein, M represents an alkali metal or zinc; x represents a number of 0 to 6; y represents a number of 0 to 6; z represents a number of 0.1 to 4; p represents the valency of M; and n represents the number of crystal water of 0 to 100).

Examples of the above-described lubricants include fatty acid amides such as laurylamide, myristylamide, stearylamide and behenyl amide; ethylene-bis stearylamide; polyethylene wax; metallic soaps such as calcium stearate and magnesium stearate; and metal phosphates such as magnesium distearyl phosphate and magnesium stearyl phosphate.

As the above-described filler, an inorganic substance such as talc, silica, calcium carbonate, glass fiber, potassium titanate or potassium borate is employed by appropriately selecting the particle size in the case of spherical filler or the fiber diameter, fiber length and aspect ratio in the case of fibrous filler. Further, it is preferred that the filler be subjected to a surface treatment as required.

Examples of the above-described antistatic agents include cationic antistatic agents such as fatty acid quaternary ammonium ion salts and quaternary polyamine salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; amphoteric alkyl betaines such as alkyl dimethylamino acetic acid betaine; and amphoteric antistatic agents such as imidazoline-type amphoteric activators. These antistatic agents may be used individually, or two or more thereof may be used in combination.

Further, in cases where the resin additive masterbatch according to the present invention is used for an agricultural film, a UV absorber may be blended in order to control the crop growth; an infrared absorber may be blended in order to improve the heat retaining properties; and/or an anti-clouding agent or an anti-fogging agent may be blended since fogging may occur inside the house or dew condensation may occur on the film surface to prevent sufficient amount of light from reaching the crops.

EXAMPLES

The present invention will now be described in more detail by way of examples thereof. However, the present invention is not restricted to the following examples by any means.

Examples 1 to 5 and 7 to 19, Comparative Examples 1 to 14

To 100 parts by mass of polypropylene (homo-PP, M.I. (Melt Index)=8 g/10 min), in accordance with the formulations shown in Tables 1 to 4 below, an additive (B) was added along with components (C) to (E) and the like, and the resultant was stirred for 20 minutes using a Henschel mixer. The thus obtained powder was made into a pellet using an extruder at 170° C.

Example 6

A resin pellet was prepared in accordance with the formulation shown in Table 1 below under the same conditions as the above-described mold processing conditions except that the polypropylene resin was changed to an impact-PP (M.I.=25 g/10 min).

<Evaluation Items>

Evaluations were performed on the strand strength and processability in the resin pellet preparation step as well as the color tone, exuding property and blocking property of the obtained resin pellets. The results are shown together in Tables 1 to 4. Further, the evaluation methods are each described in the followings.

<Evaluation of Strand Strength>

A strand was stretched with hands at the time of extrusion molding and the strand strength was evaluated as: "○" for a strand which was not broken even when stretched strongly; "Δ" for a strand which was broken when stretched strongly; and "x" for a strand which was broken when stretched gently.

<Evaluation of Mass Productivity>

The mass productivity was evaluated as: "⊙" for a strand which was able to be continuously produced for 3 hours or longer; "○" for a strand which was broken in 1 to 3 hours; "Δ" for a strand which was broken 1 to 5 times in less than 1 hour; and "x" for a strand which was broken 6 times or more in less than 1 hour.

<Color Tone of Resin Pellet>

For the resin pellets obtained in the above-described Examples and Comparative Examples, the Y.I. (Yellow Index) was measured using a color difference meter (manufactured by Suga Test Instruments Co., Ltd.). The color tone was evaluated as: "○" when the Y.I. value was less than 20; "Δ" when the Y.I. value was 20 to 30; and "x" when the Y.I. value was greater than 30.

<Evaluation of Exuding Property>

The resin pellets obtained in the above-described Examples and Comparative Examples were each placed in an amount of 5 g into a 12 cm×8 cm envelope made of a filter paper. After keeping the envelope at 50° C. for 24 hours, the increase in the mass of the envelope was divided by the mass of the additive to determine the exuding rate in terms of percentage. A higher exuding rate means that the pellet quality is less suitable for storage.

<Evaluation of Blocking Property>

The resin pellets obtained in the above-described Examples and Comparative Examples were each placed in an amount of 20 g into a 10 cm×6 cm polyethylene bag and stored at 50° C. for 14 days under a load of 80 g/cm². The resin pellets were then stored at room temperature for 3 days and the blocking condition of each pellet was checked by loosening the pellet with hands. The blocking properly was evaluated as: "○" when blocking was not observed; "Δ" when partial blocking was observed; and "x" when blocking was observed over the entire pellet.

As seen from the results shown in Tables 1 to 4, in the Examples according to the present invention, it was confirmed that a resin additive masterbatch having excellent ease of handling in which the strand breakage during production is limited and the tackiness of the resulting pellet is also low. In contrast, in those masterbatches of Comparative Examples which lack the component (C) and/or the component (D), the strand strength in extrusion molding was low and the mass productivity was poor. In addition, the resulting pellets had a large amount of exuded additive and high tackiness.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Component (B) | Compound represented by the Formula (6) | Compound No. 19 | 100 | — | 150 | 150 | 150 | 150 | 150 | 150 | 150 | 150 |
| | | Compound No. 20 | — | 100 | — | — | — | — | — | — | — | — |
| | Compound represented by the Formula (7) | Compound No. 21 | — | — | — | — | — | — | — | — | 80 | — |
| | | Compound No. 22 | — | — | 80 | 80 | 80 | 80 | 80 | 80 | — | 80 |
| Component (C) | Compound represented by the Formula (1) | Compound No. 1 | 1.0 | 1.0 | 3.0 | — | — | — | 3.0 | — | — | 3.0 |
| | | Compound No. 2 | — | — | — | 3.0 | — | — | — | — | — | — |
| | | Compound No. 3 | — | — | — | — | 3.0 | — | — | — | — | — |
| | Compound represented by the Formula (2) | Na benzoate | — | — | — | — | — | 3.0 | — | — | — | — |
| | | ATBA*[1] | — | — | — | — | — | — | 3.0 | — | — | — |
| | Compound represented by the Formula (3) | Compound No. 5 | — | — | — | — | — | — | — | 3.0 | — | — |
| | Compound represented by the Formula (4) | Compound No. 6 | — | — | — | — | — | — | — | — | 3.0 | — |
| Component (D) | Compound represented by the Formula (5) | Compound No. 11 | — | — | — | — | — | — | — | — | — | 3.0 |
| | | Compound No. 12 | 1.0 | 1.0 | 3.0 | — | — | 3.0 | 3.0 | 3.0 | 3.0 | — |
| | | Compound No. 13 | — | — | — | — | 3.0 | — | — | — | — | — |
| | | Compound No. 14 | — | — | — | 3.0 | — | — | — | — | — | — |
| | | Compound No. 15 | — | — | — | — | — | — | — | — | — | — |
| | 12 HSA-based compound | 12-HSA-Li*[2] | — | — | — | — | — | — | — | — | — | — |
| Component (E) | (Melting point lowering agent) | Na laurylsulfate | — | — | — | — | — | — | — | — | — | — |
| | Evaluation | Strand strength | ◉ | ○ | ◉ | ○ | ○ | ○ | ○ | ○ | ○ | ○ |
| | | Mass productivity | ◉ | ○ | ◉ | ○ | ○ | ○ | ○ | ○ | ○ | ○ |
| | | Color tone | ○ | ○ | ○ | ○ | ○ | ○ | ○ | ○ | ○ | ○ |
| | | Exuding rate (%) | 0 | 3 | 0 | 2 | 5 | 9 | 8 | 7 | 5 | 5 |
| | | Anti-blocking property | ○ | ○ | ○ | ○ | ○ | ○ | ○ | ○ | ○ | ○ |

*[1] aluminum tris(p-t-butylbenzoate)
*[2] lithium 12-hydroxystearate

TABLE 2

| | | | Example | | | | | | | | |
|---|---|---|---|---|---|---|---|---|---|---|---|
| | | | 11 | 12 | 13 | 14 | 15 | 16 | 17 | 18 | 19 |
| Component (B) | Compound represented by the Formula (6) | Compound No. 19 | 150 | 150 | 150 | 150 | 200 | 70 | — | — | — |
| | | Compound No. 20 | — | — | — | — | — | — | 150 | 100 | 70 |
| | Compound represented by the Formula (7) | Compound No. 21 | — | — | — | — | — | — | — | — | — |
| | | Compound No. 22 | 80 | 80 | 80 | 80 | 100 | 70 | 80 | 50 | 70 |
| Component (C) | Compound represented by the Formula (1) | Compound No. 1 | 3.0 | — | — | 0.5 | 3.0 | — | 3.0 | 2.0 | 2.0 |
| | | Compound No. 2 | — | 3.0 | 2.0 | — | — | 3.0 | — | — | — |
| | | Compound No. 3 | — | — | — | — | — | — | — | — | — |
| | Compound represented by the Formula (2) | Na benzoate | — | — | — | — | — | — | — | — | — |
| | | ATBA*[1] | — | — | — | — | — | — | — | — | — |
| | Compound represented by the Formula (3) | Compound No. 5 | — | — | — | — | — | — | — | — | — |
| | Compound represented by the Formula (4) | Compound No. 6 | — | — | — | — | — | — | — | — | — |
| Component (D) | Compound represented by the Formula (5) | Compound No. 11 | — | — | — | — | — | — | — | — | — |
| | | Compound No. 12 | — | — | 3.0 | 0.5 | 3.0 | — | 2.0 | 2.0 | 2.0 |
| | | Compound No. 13 | — | — | — | — | — | — | — | — | — |
| | | Compound No. 14 | — | — | — | — | — | 3.0 | — | — | — |
| | | Compound No. 15 | 3.0 | — | — | — | — | — | — | — | — |
| | 12 HSA-based compound | 12-HSA-Li*[2] | — | 3.0 | — | — | — | — | — | — | — |
| Component (E) | (Melting point lowering agent) | Na laurylsulfate | — | — | 1.0 | — | — | — | — | — | — |
| | Evaluation | Strand strength | ◉ | ○ | ○ | ○ | ○ | ○ | ○ | ◉ | ◉ |
| | | Mass productivity | ◉ | ○ | ○ | ○ | ○ | ○ | ○ | ○ | ○ |
| | | Color tone | ○ | ○ | ○ | ○ | ○ | ○ | ○ | ○ | ○ |
| | | Exuding rate (%) | 1 | 4 | 5 | 6 | 5 | 5 | 6 | 5 | 3 |
| | | Anti-blocking property | ○ | ○ | ○ | ○ | ○ | ○ | ○ | ○ | ○ |

*[1] aluminum tris(p-t-butylbenzoate)
*[2] lithium 12-hydroxystearate

TABLE 3

|  |  |  | Comparative Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Component (B) | Compound represented by the Formula (6) | Compound No. 19 | 150 | — | — | 100 | 75 | 150 | 150 | 75 | 150 | 150 |
|  |  | Compound No. 20 | — | 100 | 150 | — | — | — | — | — | — | — |
|  | Compound represented by the Formula (7) | Compound No. 22 | — | — | — | 50 | 75 | 80 | 80 | 75 | 80 | 80 |
| Component (C) | Compound represented by the Formula (1) | Compound No. 1 | — | — | — | — | — | — | 3.0 | 2.0 | — | — |
|  | Compound represented by the Formula (2) | Na benzoate | — | — | — | — | — | — | — | — | — | — |
|  |  | ATBA*[1] | — | — | — | — | — | — | — | — | — | — |
| Component (D) | Compound represented by the Formula (5) | Compound No. 12 | — | — | — | — | — | — | — | — | 3.0 | — |
|  |  | Compound No. 14 | — | — | — | — | — | — | — | — | — | 2.0 |
| Other Component |  | EBSA*[2] | — | — | — | — | — | — | — | — | — | — |
|  |  | Talc | — | — | — | — | — | — | — | — | — | — |
| Evaluation |  | Strand strength | x | x | x | x | x | x | Δ | Δ | Δ | Δ |
|  |  | Mass productivity | x | x | x | x | x | x | Δ | Δ | ○ | Δ |
|  |  | Color tone | x | x | x | x | x | x | ○ | ○ | ○ | ○ |
|  |  | Exuding rate (%) | 22 | 25 | 38 | 21 | 19 | 28 | 13 | 16 | 10 | 11 |
|  |  | Anti-blocking property | x | x | x | x | x | x | Δ | Δ | Δ | Δ |

*[1] aluminum tris(p-t-butylbenzoate)
*[2] ethylene-bis stearylamide

TABLE 4

|  |  |  | Comparative Example | | | |
|---|---|---|---|---|---|---|
|  |  |  | 11 | 12 | 13 | 14 |
| Component (B) | Compound represented by the Formula (6) | Compound No. 19 | 150 | 150 | 150 | 150 |
|  |  | Compound No. 20 | — | — | — | — |
|  | Compound represented by the Formula (7) | Compound No. 22 | 80 | 80 | 80 | 80 |
| Component (C) | Compound represented by the Formula (1) | Compound No. 1 | — | — | — | 3.0 |
|  | Compound represented by the Formula (2) | Na benzoate | 3.0 | — | — | — |
|  |  | ATBA*[1] | — | 3.0 | — | — |
| Component (D) | Compound represented by the Formula (5) | Compound No. 12 | — | — | — | — |
|  |  | Compound No. 14 | — | — | — | — |
| Other Component |  | EBSA*[2] | — | — | — | 3.0 |
|  |  | Talc | — | — | 3.0 | — |
| Evaluation |  | Strand strength | Δ | Δ | x | Δ |
|  |  | Mass productivity | Δ | Δ | Δ | Δ |
|  |  | Color tone | Δ | Δ | Δ | ○ |
|  |  | Exuding rate (%) | 18 | 21 | 18 | 11 |
|  |  | Anti-blocking property | x | x | x | Δ |

*[1] aluminum tris(p-t-butylbenzoate)
*[2] ethylene-bis stearylamide

The invention claimed is:

1. A resin additive masterbatch, which comprises, with respect to 100 parts by mass of (A) a polyolefin crystalline resin:

(i) 100 to 300 parts by mass of (B) a resin additive, wherein said (B) resin additive comprises a hindered amine compound represented by the following Formula (6):

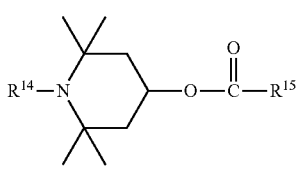

(6)

wherein $R^{14}$ represents a hydrogen atom, a $C_1$ to $C_4$ alkyl group; and $R^{15}$ represents a $C_5$ to $C_{21}$ alkyl group, or wherein said (B) resin additive comprises a benzoate compound represented by the following Formula (7):

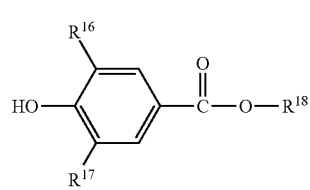

(7)

wherein $R^{16}$ and $R^{17}$ each represent a $C_1$ to $C_8$ alkyl group; and $R^{18}$ represents a $C_1$ to $C_{30}$ alkyl group;

(ii) 0.5 to 3.0 parts by mass of (C) a metal salt of an organic acid other than fatty acid, wherein said (C) metal salt of an organic acid other than fatty acid is at least one of an aromatic phosphate represented by the following Formula (1), an aromatic carboxylate represented by the following Formula (2) and an alicyclic carboxylate represented by the following Formula (3) or (4):

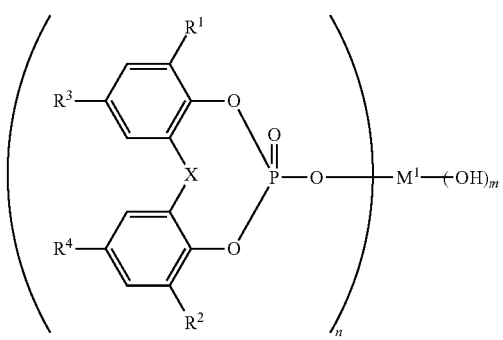

wherein $M^1$ represents an alkali metal, an alkaline earth metal or aluminum, n represents 1 when $M^1$ is an alkali metal, 1 or 2 when $M^1$ is an alkaline earth metal, or 1, 2 or 3 when $M^1$ is aluminum, m represents 0 when n has the same valence as $M^1$, 1 when n has a valence one smaller than that of $M^1$, or 2 when n has a valence two smaller than that of $M^1$, $R^1$ to $R^4$ each independently represent a hydrogen atom or a $C_1$ to $C_8$ alkyl group; and X represents a $C_1$ alkanediyl group,

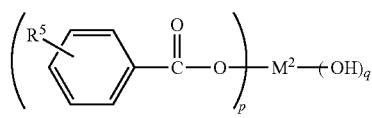

wherein $M^2$ represents an alkali metal, an alkaline earth metal or aluminum; p represents 1 when $M^2$ is an alkali metal, 1 or 2 when $M^2$ is an alkaline earth metal, or 1, 2 or 3 when $M^2$ is aluminum, q represents 0 when p has the same valence as $M^2$, 1 when p has a valence one smaller than that of $M^2$, or 2 when p has a valence two smaller than that of $M^2$, and $R^5$ represents a hydrogen atom or a $C_1$ to $C_8$ alkyl group,

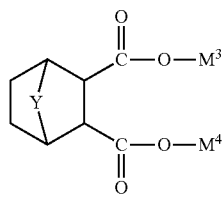

wherein Y represents methylene, and $M^3$ and $M^4$ each represent an alkali metal,

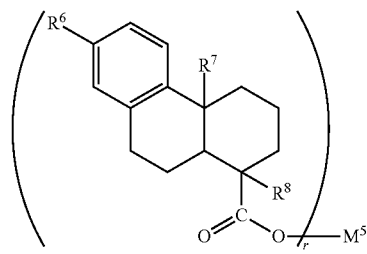

and
wherein $R^6$ to $R^8$ each represent a hydrogen atom or a $C_1$ to $C_8$ alkyl group, $M^5$ represents an alkali metal or an alkaline earth metal, and r represents 1 or 2, and (iii) 0.5-3.0 parts by mass of (D) a gelling agent,
wherein said (D) gelling agent is a dibenzylidene sorbitol compound represented by the following Formula (5):

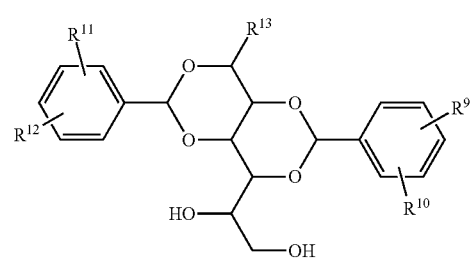

wherein $R^9$ to $R^{13}$ each independently represent a hydrogen atom or a $C_1$ to $C_4$ alkyl group, or
wherein said (D) gelling agent is a 12-hydroxystearic acid-based compound selected from the group consisting of 12-hydroxystearic acid, alkali metal salts of 12-hydroxystearic acid and alkaline earth metal salts of 12-hydroxystearic acid said (B) resin additive retaining a liquid state when melted with heating to 250° C. and then cooled to 80° C. and kept for 30 minutes.

2. A method of producing the resin additive masterbatch of claim 1, comprising: blending said (C) metal salt of an organic acid other than fatty acid and said (D) gelling agent to said (A) crystalline resin.

3. The resin additive masterbatch according to claim 1, wherein said (B) resin additive comprises a hindered amine compound represented by Formula (6), wherein $R^{14}$ represents a hydrogen atom, a $C_1$ to $C_4$ alkyl group; and $R^{15}$ represents a $C_5$ to $C_{21}$ alkyl group.

4. The resin additive masterbatch according to claim 1, wherein said (B) resin additive comprises a benzoate compound represented by Formula (7), wherein $R^{16}$ and $R^{17}$ each represent a $C_1$ to $C_8$ alkyl group; and $R^{18}$ represents a $C_1$ to $C_{30}$ alkyl group.

5. The resin additive masterbatch according to claim 1, wherein said (C) metal salt of an organic acid other than fatty acid is an aromatic phosphate represented by Formula (1), wherein $M^1$ represents an alkali metal, an alkaline earth metal or aluminum, n represents 1 when $M^1$ is an alkali metal, 1 or 2 when $M^1$ is an alkaline earth metal, or 1, 2 or 3 when $M^1$ is aluminum, m represents 0 when n has the same valence as $M^1$, 1 when n has a valence one smaller than that of $M^1$, or 2 when n has a valence two smaller than that of $M^1$, $R^1$ to $R^4$ each independently represent a hydrogen atom or a $C_1$ to $C_8$ alkyl group; and X represents a $C_1$ alkanediyl group.

6. The resin additive masterbatch according to claim 1, wherein said (C) metal salt of an organic acid other than fatty acid is an aromatic carboxylate represented by Formula (2), wherein $M^2$ represents an alkali metal, an alkaline earth metal or aluminum; p represents 1 when $M^2$ is an alkali metal, 1 or 2 when $M^2$ is an alkaline earth metal, or 1, 2 or 3 when $M^2$ is aluminum, q represents 0 when p has the same valence as $M^2$, 1 when p has a valence one smaller than that of $M^2$, or 2 when p has a valence two smaller than that of $M^2$, and $R^5$ represents a hydrogen atom or a $C_1$ to $C_8$ alkyl group.

7. The resin additive masterbatch according to claim 1, wherein said (C) metal salt of an organic acid other than fatty acid is an alicyclic carboxylate represented by Formula (3), wherein Y represents methylene, and $M^3$ and $M^4$ each represent an alkali metal.

8. The resin additive masterbatch according to claim 1, wherein said (C) metal salt of an organic acid other than fatty acid is an alicyclic carboxylate represented by Formula (4), wherein $R^6$ to $R^8$ each represent a hydrogen atom or a $C_1$ to $C_8$ alkyl group, $M^5$ represents an alkali metal or an alkaline earth metal, and r represents 1 or 2.

9. The resin additive masterbatch according to claim 1, wherein said (D) gelling agent is a dibenzylidene sorbitol compound represented by Formula (5), and wherein $R^9$ to $R^{13}$ each independently represent a hydrogen atom or a $C_1$ to $C_4$ alkyl group.

10. The resin additive masterbatch according to claim 1, wherein said (D) gelling agent is a 12-hydroxystearic acid-based compound selected from the group consisting of 12-hydroxystearic acid, alkali metal salts of 12-hydroxystearic acid and alkaline earth metal salts of 12-hydroxystearic acid.

* * * * *